Figure 1:
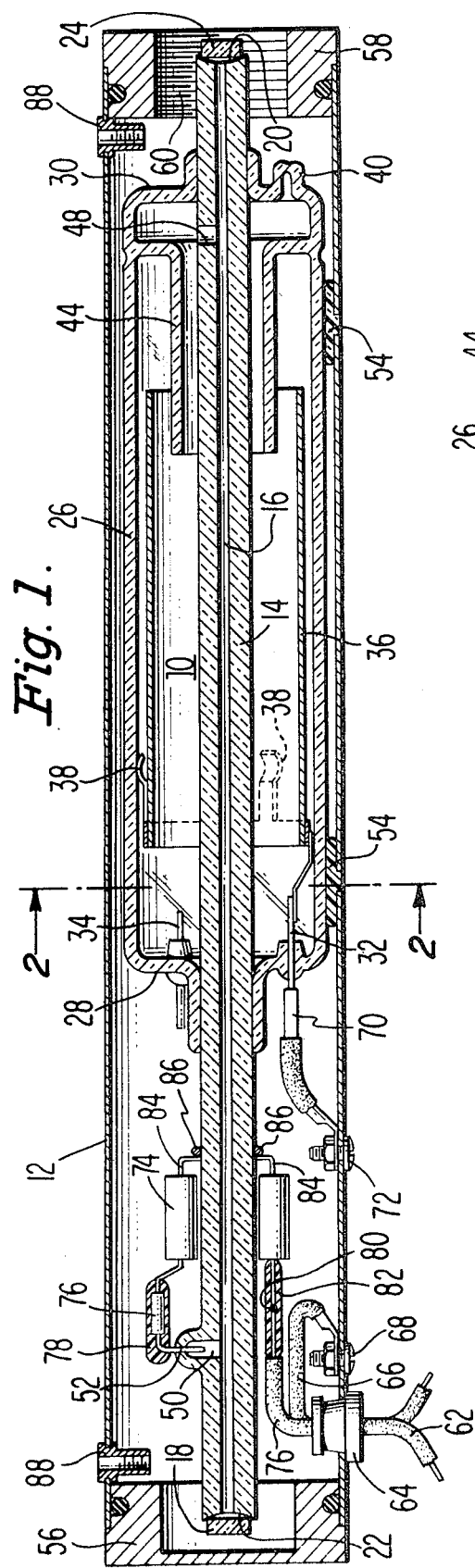

United States Patent [19]

Mark

[11] 3,739,297
[45] June 12, 1973

[54] SINGLE BORE TUBE GAS LASER
[75] Inventor: John Thomas Mark, Lancaster, Pa.
[73] Assignee: RCA Corporation, New York, N.Y.
[22] Filed: June 21, 1971
[21] Appl. No.: 154,826

[52] U.S. Cl. ................. 331/94.5, 313/217, 313/220
[51] Int. Cl. ........................... H01s 3/02, H01s 3/22
[58] Field of Search ................. 331/94.5; 313/217, 313/220

[56] References Cited
UNITED STATES PATENTS

| 3,566,302 | 2/1971 | Rhodes | 331/94.5 |
| 3,619,811 | 11/1971 | Kaiser et al. | 331/94.5 |
| 3,627,429 | 8/1968 | Jaenicke | 331/94.5 |
| 3,298,894 | 1/1967 | Barnette | 331/94.5 |
| 3,617,926 | 11/1971 | Bullinger | 331/94.5 |

OTHER PUBLICATIONS
Bridges et al., Laser Focus, Vol. 5, No. 19, Oct. 1969, pp. 39–42.

*Primary Examiner*—Ronald L. Wibert
*Assistant Examiner*—R. J. Webster
*Attorney*—Edward J. Norton

[57] ABSTRACT

A gas laser employing a single bore tube having the laser mirrors attached to and terminating the opposite ends thereof and a bulb surrounding the bore tube, with the ends of the bulb being attached to the bore tube at two spaced points intermediate the ends of the bore tube. A hole through the wall of the bore tube provides communication between the bore and the inside of the bulb.

Also disclosed is means for shock mounting such a discharge tube in a cylindrical container with the axis of the bore tube in substantially coincident relationship with the axis of the container.

6 Claims, 3 Drawing Figures

PATENTED JUN 12 1973   3,739,297

INVENTOR.
John T. Mark
BY George J. Seligsohn
ATTORNEY

SINGLE BORE TUBE GAS LASER

This invention relates to gas lasers, and, more particularly, to gas lasers having an improved structure which provides increased mechanical and thermal stability.

Relatively inexpensive, low power, sealed gas-lasers, (such as He—Ne lasers), incorporating an integral-mirror optical cavity, now exist in the prior art. It is desirable that such lasers have simple, compact structures in order to achieve both low cost and easy handling thereof. For this reason, laser devices have been developed which have coaxial symmetry with a bulb of the laser device enclosing and surrounding respective portions of first and second separate, spaced, axially-oriented bore tubes having bores which communicate with the inside of the bulb. The first bore tube, after passing through one end of the bulb, is terminated at its distal end by one of the mirrors of the optical cavity and the second bore tube, after passing through the other end of the bulb, is terminated at its distal end by the other of the mirrors of the optical cavity. One of the electrodes of the laser, such as its cathode, is located within the bulb but outside of either bore tube, while the other electrode of the laser, such as its anode, is in cooperative relationship with the bore of one of the first and second bore tubes, but not the other. Both the bore tubes and the bulb are filled with laser gas, so that the bulb provides the large reservoir of laser gas for the bore tubes which is needed to provide sealed gas lasers with long life. By arranging this required reservoir of gas so that it surrounds a significant portion of both bore tubes, an overall compact design is achieved for this type of prior art gas laser.

The prior art use of two separate bore tubes, each of which is supported in cantilever suspension by only that one of the respective ends of the bulb that it passes through, creates problems because it is difficult initially to align them with the required precision and because they do not maintain their alignment due to the relative mechanical and thermal instability of such a gas laser. In particular, the alignment of the optical cavity of the laser is affected by mechanical and thermal stresses to which the bore tubes are subject, so that the power output of such a laser is not as stable as desirable. This is because variations in the ambient temperature of the environment, the orientation of the laser with respect to the vertical and other environmental factors, which either affect the thermal or mechanical equilibrium of the bore tubes, causes a shift in the power output of such a laser.

The present invention overcomes these problems by employing a single bore tube, which extends the entire length of the laser and is terminated at its opposite ends by the respective mirrors of the optical cavity of the laser. This single bore tube, which is preferably made of a thick-walled capillary tube, is surrounded over an intermediate portion thereof with a bulb, which is preferably disposed coaxially with respect thereto. A hole through the wall of the bore tube, located within the intermediate portion of the bore tube, permits communication between the bore and the inside of the bulb. The use of a single bore tube, supported at two spaced points by the bulb and surrounded by laser gas provides simply and inexpensively a more rigid tube having desired mechanical and thermal stability; features absent in prior art laser tubes of this type.

Figure 3:
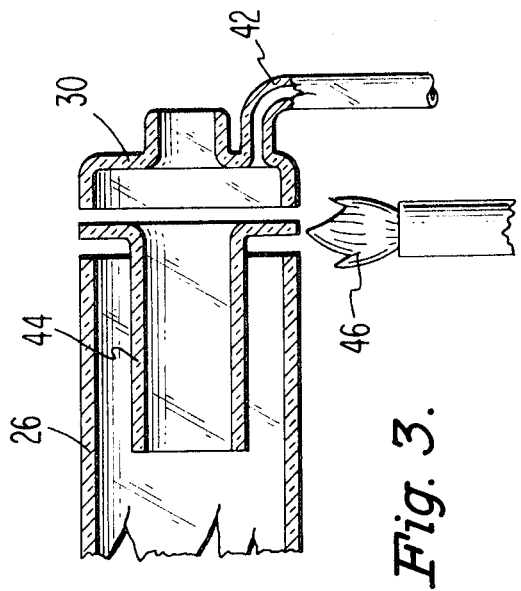
Figure 2:
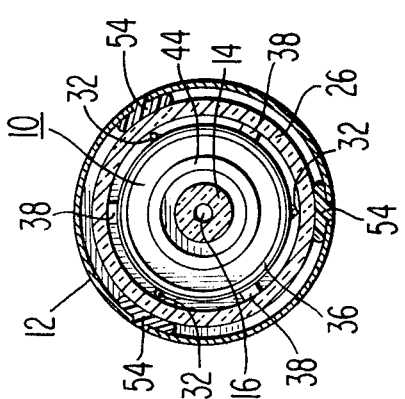

These and other features and advantages of the present invention will become more apparent from the following detailed description taken together with the accompanying drawings, in which:

FIG. 1 is an elevation cross-sectional view of a preferred embodiment of the laser tube of the present invention situated in a preferred environment, FIG. 2 is a cross-section of the apparatus shown in FIG. 1, taken along section line 2 — 2, and FIG. 3 is a fragmentary view showing how a portion of the laser tube of FIG. 1 is fabricated.

Referring now to FIGS. 1 and 2, there is shown an assembled laser tube 10 which, although in no way essential to the invention, is wholly contained within laser head 12. Also shown are various elements, none of which are essential to the present invention, coupled to laser tube 10 and/or laser head 12. All of these elements and laser head 12 are included in FIG. 1 merely to show a preferred environment for locating laser tube 10, which happens to be actually used in practice.

Laser tube 10 itself consists of a single thick-walled capillary tube 14 having a bore 16 extending therethrough. The term "thick-walled" capillary tube, as used herein, means a capillary tube in which the thickness of the wall of the capillary tube is at least the diameter of the bore therethrough. For instance, in a practical example capillary, tube 14 had an outer diameter of 0.420 inches, while the diameter of bore 16 was 0.060 inches. Therefore, in this case, the thickness of the wall of capillary tube 14 was 0.180 inches, or three times the diameter of bore 16. Thus, a thick-walled capillary tube, such as tube 14, is quite rigid.

As shown in FIG. 1, both left end 18 and right end 20 of capillary tube 14 are somewhat concave in shape. In practice, the radius of curvature of ends 18 and 20 is much less than is shown in FIG. 1. For instance, in the above example, where the outer diameter of capillary tube 14 is 0.420 inches, the radius of curvature of concave surfaces 18 and 20 is three inches. However, for the sake of clarity in the drawing, the radius of curvature of each of ends 18 and 20 has been exaggerated in the drawing. Concave ends 18 and 20, which are ground to be spherical with great precision (tolerances preferably in the order of only a few ten thousandths of an inch) are used for the purpose of initially aligning totaling reflecting mirror 22 and output mirror 24 to be in parallel relationship with respect to each other (i.e. the relationship required for a laser optical cavity). Mirrors 22 and 24, after being properly aligned, are permanently cemented to ends 18 and 20, respectively, by a sealant (not shown).

Surrounding a portion of capillary tube 14 is bulb 26, which includes a left end section 28 and a right end section 30 both of which are fused to the outside of the wall of capillary tube 14. In the case where the outer diameter of capillary tube 14 is 0.420 inches, the outer diameter of bulb 26 may be about 1 ¼ inches.

Left end portion 28 includes a plurality of circumferentially disposed pins, such as pins 32 and 34, which extend therethrough. For instance, the total number of such pins may be seven and they may be disposed at equal angular intervals around the circumference of left end portion 28. At least one of the pins, such as pin 32, is connected to cold cathode 36, which may be an aluminum cylinder. The one or more pins, such as pin 32, which are attached to cathode 36 provide mechanical support therefor. In addition, a single one of these pins, such as pin 32 itself, is utilized as an electrode to provide electrical connection to cathode 36 from outside laser tube 10. Also providing mechanical support for cathode 36 are three spring clips 38, which are distributed circumferentially at 120° intervals between cathode 36 and the inside of the wall of bulb 26.

A pin, such as pin 34, may be employed for purposes as supporting a getter, applying a discharge starting potential, etc. or it may not be utilized at all. Right end portion 30 of bulb 26 includes sealed tip 40 from which originated the exhaust tubulation 42, shown in FIG. 3, utilized during the fabrication of the tube. Shield 44 is coupled to right end portion 30 of bulb 26 and is situated as shown in spaced surrounding relationship with capillary tube 14.

The manner in which shield 44 is connected both to bulb 26 and end portion 30 during fabrication of laser tube 10 is shown in FIG. 3. These elements are fused to each other by means of heat supplied by a gas flame 46.

Bore 16 of capillary tube 14 hole connected to the interior of bulb 26 by a hold 48 through the wall of capillary tube 14. As shown, hole 48 is situated at the distal end of shield 44 in the vicinity of right end portion 30 of bulb 26.

An anode region 50 communicating with bore 16 is formed by a closed hole in the wall of capillary tube 14. Anode region 50 is disposed in a relatively long portion of capillary tube 14 which extends between the left end portion 28 of bulb 26 and the left end 18 of capillary tube 14 itself, as shown. Connecting anode region 50 to the outside of tube 10 is electrode pin 52.

It should be understood that tube 10, as just described, may be placed in any appropriate environment. However, in the preferred environment shown in FIG. 1, tube 10 is wholly contained within laser head 12, which is composed of a cylinder of metal, such as aluminum. In particular, tube 10 is shock mounted to container 12, in a manner to be described below, by means of elastomer adhesive pads 54, such as silicone rubber, which preferably exhibit a small degree of mechanical hysteresis. Laser head 12 includes a left end portion 56 in the vicinity of totally reflecting mirror 22 and a right end portion 58 in the vicinity of output mirror 24. As shown, left end portion 56 is totally enclosed (with the possible exception of ventilation holes therein) to provide protection for laser 10 at that end. However, right end portion 58 is supplied with threaded central hole 60 to permit output radiation from mirror 24 to emerge from laser 10. During shipment of the complete laser head including laser tube 10, a screw cap, not shown, may be inserted into threaded central hole 60 to protect mirror 24. Further auxiliary equipment, such as a telescope, may be inserted into threaded central hole 60.

For the purpose of electrically connecting laser tube 10 to a power supply, not shown, a pair of wires 62 enters laser head 12 through grommet 64. One wire 66 of wire pair 62, which is normally electrically grounded, is connected to head 12 by screw terminal 68. Cathode 36 of tube 10 is therefore also electrically grounded by connection to head 12 by means of pin 32, wire 70 and screw terminal 72, as shown. Anode pin 52 is connected to the hot side of the power supply by means of current-limiting resistance 74 and wire 76 of wire pair 62. In particular, as shown, current-limiting resistance 74 includes a top portion having a right-end lead which is electrically connected to anode pin 52 by crimped splice 76. Elastomer 78 is used to insulate this connection. The left end of the lower portion of resistance 74 is connected to wire 76 by a spot weld 80 which is insulated by elastomer 82. The upper and lower portions of resistance 74 are electrically connected in series with each other by a stiff, electrically connecting wire 84. Wire 84, by partially surrounding tube 14, also mechanically supports resistance 74. Holding wire 84 around tube 14 is ring 86. When a suitable excitation voltage is applied to wire pair 62, a gas discharge is initiated in a laser gas, such as He—Ne that fills both bulb 26 and bore 16. This discharge extends from anode pin 52, through anode region 50, bore 16, hole 48, the region between shield 44 and capillary tube 14, and finally to cylindrical cathode 36. The purpose of shield 44 is to guide the gas discharge plasma and spread it over a relatively large area of cathode 36. This prevents any given local point of cathode 36 from experiencing an electrical field high enough to result in undesirable sputtering of the cathode material. By preventing sputtering, the presence of shield 44 lengthens the life of laser tube 10.

Since only bore 16 is in cooperative relationship with mirrors 22 and 24, only the portion of the discharge which takes place in bore 16 is in cooperative relationship with the optical cavity formed by mirrors 22 and 24. Therefore, lasing takes place only in bore 16, with the resulting laser output radiation being transmitted by partially reflecting output mirror 24.

Peak power output of the laser depends upon mirrors 22 and 24 being initially placed in strict parallel relationship with respect to each other and then maintaining this relationship. Furthermore, it is desirable that bore 16 be substantially coincident with the axis of laser head cylinder 12 independent of the angular orientation thereof. Since bulb 26 is made of relatively cheap glass tubing, in order to achieve peak power from the laser, it is important that the exact position of laser tube 10 within the laser head 12 be established prior to the application of elastomer pads 54. In order to accomplish this, laser head 12 is provided with a plurality of threaded apertures, such as rivet nuts 88 or the equivalent, at suitable angular intervals near the left end thereof and near the right end thereof. (In practice, four riveted nuts are used at each end.) During assembly of the laser head, before elastomer pads 54 are applied, respective support screws (not shown) are individually inserted in each of rivet nuts 88 and are brought into contact with a corresponding point of capillary tube 14 to thereby support laser tube 10 within laser head 12. Laser tube 10 is now operated and the laser output obtained therefrom is measured. Then, the support screws are adjusted until the laser output is a maximum and is substantially independent of the angular position of the laser head cylinder 12. While laser tube 10 is maintained in this desired position by the support screws, a suitable amount of elastomer, in uncured liquid form, is applied through appropriately placed holes in the wall of laser head 12 to provide each of the plurality of elastomer pads 54 connecting bulb 26 of laser tube 10 to the inner surface of laser head 12, as shown in FIGS. 1 and 2. Although the support screws may be permanently left in their adjusted position, usually they are removed from rivet nuts 88 after the elastomer of pads 54 has fully cured. It is for this reason that they are not shown in FIG. 1. In the case where the walls of the container are sufficiently thick, the aperture walls may be threaded, and rivet nuts dispensed with.

The optimum positioning of laser tube 10 within laser head, just described, is useless unless laser tube 10 is both mechanically and thermally stable, so that the initial peaking of the laser output is maintained over a long period of time. Otherwise, thermal expansion or contraction, resulting from changes in temperature, and slight shifting in position due to vibration or shock, both of which cannot be avoided, will cause a slight change in the spatial relationship between mirrors 22 and 24 of the laser tube optical cavity.

Mechanical and thermal stability is provided in the laser device of FIGS. 1 and 2 by employing thick-walled single capillary tube 14, to which both mirrors 22 and 24 are attached, and then supporting this capillary tube at two relatively widely spaced points by left end portion 28 and right end portion 30 of bulb 26. This supplies the required mechanical and thermal stability to maintain mirrors 22 and 24 in strict parallel relationship once that relationship has been initially set.

The output of the laser radiation, in addition to being dependent upon the parallel relationship between mirrors 22 and 24, as just discussed, is also a function of the temperature of the gas discharge in bore 16 of laser tube 10. Thick-walled capillary tube 14 itself supplies a good deal of thermal insulation for bore 16. However, in addition thereto, the arrangement of cathode 16 and gas-filled bulb 26 acts as a bottle to maintain a relatively large portion of bore 16 at a uniform temperature. In particular, this bottle effect results from the fact that the gas pressure in laser 10 is only a few Torr, (such as 3 Torr) which is in the viscous flow range, causing the enclosed laser gas surrounding bore tube 14 to circulate, thereby maintaining the bore temperature uniform. Therefore, under operating conditions, the temperature of the gas discharge in bore 16 is relatively independent of fluctuations in ambient temperature surrounding laser tube 10.

What is claimed is:

1. A laser discharge device comprising a single axial bore tube of given length having a bore therethrough, a first mirror terminating and sealing said bore at one end of said tube, a second mirror terminating and sealing said bore at the other end of said tube, an anode electrode situated within said bore at a location towards said one end of said tube, a bulb surrounding said tube and attached thereto only at first and second ends of said bulb, said bulb having said first end bonded to the outside of said tube over a first region thereof located intermediate said anode electrode and said second end of said tube, said bulb having said second end bonded to the outside of said tube over a second region thereof located intermediate said first end of said bulb and said second end of said tube, a cathode electrode situated outside of said tube but inside of said bulb, said tube having a hole through the wall thereof communicating between the inside of said bulb and said bore, and a laser gas filling said bulb and bore, said laser gas being responsive to a discharge therethrough extending from said anode electrode through said bore and hole to said cathode electrode for creating a population inversion therein and for stimulating laser emission therefrom in said bore.

2. The laser discharge tube defined in claim 1, wherein said bore tube is a thick-walled capillary tube.

3. The laser defined in claim 1, wherein said first and second regions of said tube to which said bulb is bonded are spaced from each other by a distance which is large relative to the dimensions of said regions, and, wherein said bulb contacts said tube only at said first and second regions.

4. The laser defined in claim 1, wherein said hole is located toward said second end of said bulb.

5. The laser defined in claim 1, wherein said bulb is oriented in substantially coaxial relationship with said bore tube.

6. The laser defined in claim 5, wherein said cathode electrode is a cylindrical cold cathode oriented in spaced substantially coaxial relationship with said bore tube.

* * * * *